Oct. 8, 1957 P. T. BAIL ET AL 2,808,886
SELECTIVE PLUGGING OF GAS-INJECTION OIL WELLS
IN OIL FIELD GAS-DRIVE PROJECTS
Filed July 8, 1953
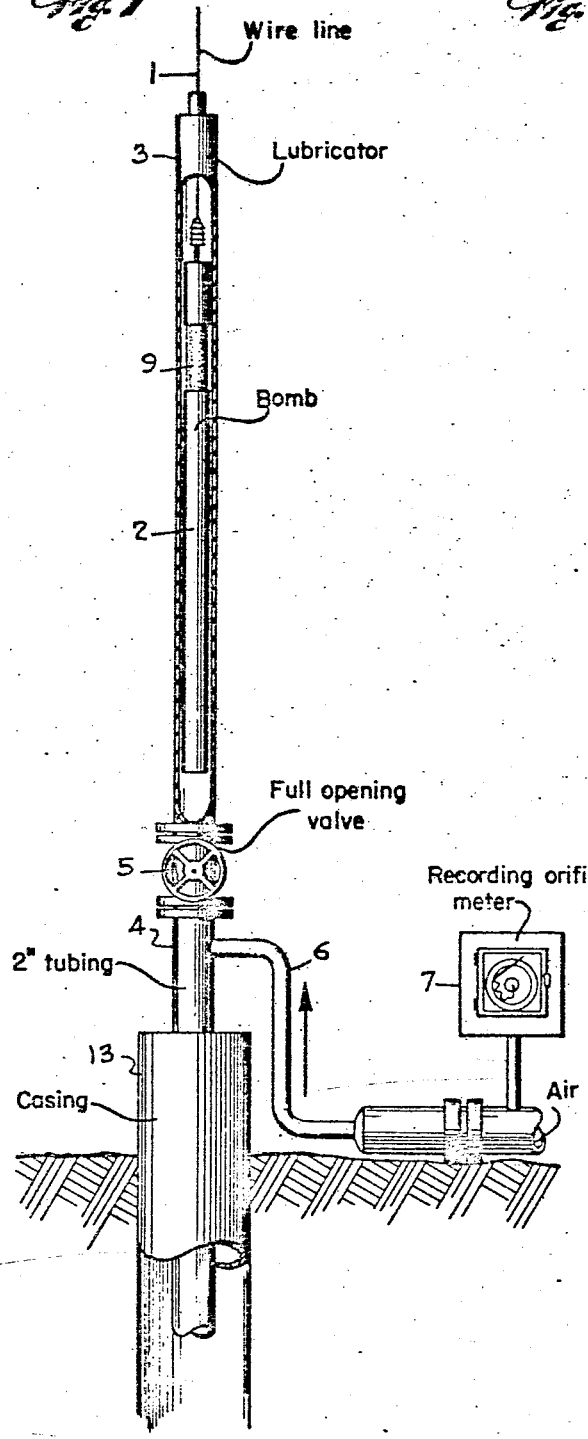
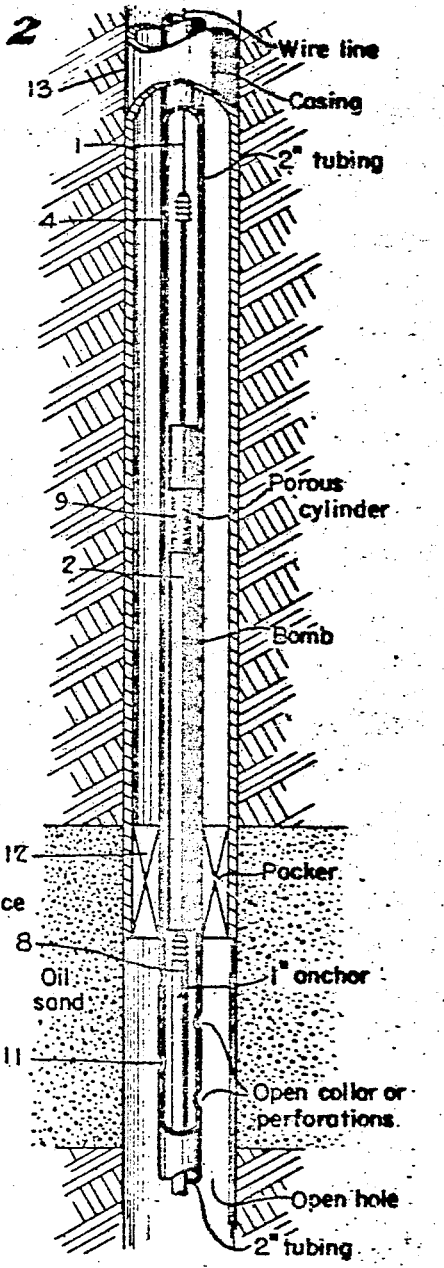
INVENTORS
Paul T. Bail
Bruce F. Grant
Simon Klosky
BY
ATTORNEY

United States Patent Office 2,808,886
Patented Oct. 8, 1957

2,808,886

SELECTIVE PLUGGING OF GAS-INJECTION OIL WELLS IN OIL FIELD GAS-DRIVE PROJECTS

Paul T. Bail and Bruce F. Grant, Tulsa, Okla., and Simon Klosky, Washington, D. C., assignors to the United States of America as represented by the Secretary of the Interior Application July 8, 1953, Serial No. 366,880

6 Claims. (Cl. 166—9)

(Granted under Title 35, U. S. Code (1952), sec. 266)

The invention herein described and claimed may be used by or for the Government of the United States of America for governmental purposes without the payment of royalties thereon or therefor.

This invention relates to a method of treating underground oil-producing formations for the purpose of increasing the recovery of oil therefrom.

It is well known to inject gas, such as air, natural gas or other gases previously recovered from other wells into underground oil-bearing formations for the purpose of increasing the recovery of oil therefrom. In such operations it is customary to inject the gas under pressure through a centrally located injection well in the formation so that the gas will drive the oil through the formation towards the surrounding recovery wells.

In most oil-bearing formations the oil occurs in a plurality of superimposed strata of varying permeabilities, and when gas is injected into the formation, oil will be recovered for a certain length of time without the injection of abnormal quantities of gas. As the recovery of oil proceeds, however, the flow of gas from the input well increases and a larger quantity of air must be supplied to maintain the recovery of oil.

This is due to the fact that the gas from the input well quickly displaces the oil from the more permeable strata, leaving open channels through which the injected gas may pass.

The present invention provides an improved method of treating underground oil-bearing formation in which by-passing of the injection gas is diminished, with a corresponding increase in useful work in expelling oil from the adjacent strata with an increase in the volume of oil recovered per unit of gas injected.

A further object of the invention is to produce in the injection gas a dispersed finely divided solid, which is insoluble in both water and oil, and which, according to currently held theories, deposits in the more permeable strata of the formation thereby avoiding or minimizing the by-passing of the least permeable strata. Regardless of the theory, however, we have found that our method is effective to increase recovery of oil per unit of gas injected.

While some of the metallic chlorides mentioned herein have previously been employed for the plugging of oil wells, by injection in the form of pure liquids or oil suspensions none of them have been applied in the form of smokes as described herein. Furthermore, they were deposited in the form of gelatinous precipitates and their action in this case was not selective. Their main purpose in these cases was to prevent water from seeping into the well.

By applying the present method to both depleted and producing strata, both objects may be effected to some degree, but reduction in the volume of gas injected per barrel of oil recovered will still result because the flow of gas through the more permeable strata is reduced much more than through the oil-bearing strata.

According to one modification of the present invention, volatile hydrolizable inorganic liquids are vaporized in a stream of wet gas so that a reaction between them occurs, which results in the formation of solid inorganic smokes, insoluble in both water and oil, which are immediately carried by the stream of injected gas into the adjacent underground strata and deposited in the more permeable channels.

Liquids suitable for this purpose are silicon tetrachloride, (B. P. 57.6° C.) titanium tetrachloride, (B. P. 136.4° C.) and tin tetrachloride, (B. P. 114.1° C.) all of which are chlorides of elements occurring in the fourth group of the periodic table and forming tetrachlorides which boil below about 140° C., but readily volatilize in a stream of gas. This group of tetrachlorides does not include carbon tetrachloride, (B. P. 76.8° C.) which is not suitable for our purpose.

Of this group, titanium tetrachloride is the preferred material and its decomposition in wet gas may be represented by the equations:

(1) $TiCl_4 + 2H_2O \rightarrow TiO_2 + 4HCl$
(2) $TiCl_4 + 4H_2O \rightarrow Ti(OH)_4 + 4HCl$
(3) $Ti(OH)_4 \rightarrow TiO_2 + 2H_2O$ In the accompanying drawings, Figs. 1 and 2, we have illustrated one method of carrying out our invention.

In Fig. 1, the character 1 refers to a wire line, which is used to lower the bomb 2, containing the liquid tetrachloride, through the lubricator 3, the tubing 4, and the valve 5, into the well. Smaller tube 6 serves to admit air from the compressor (not shown) and its volume and pressure are continuously recorded on the meter 7. In Fig. 2, the bomb 2 is shown lowered to the bottom of the well and resting on the anchor 8. When the wire line 1 is pulled upwardly the liquid tetrachloride in the bomb 2 is forced through the porous cylinder 9 and evaporates into the stream of wet air, forced down the tubing by the compressor. Whereupon, the vapors of the tetrachloride react with the moisture in the air, as indicated in the equation above, forming solid dioxide smoke and hydrogen chloride, which are carried into the oil bearing strata, through the openings 11. The packer 12 prevents the generated smoke from escaping upwardly through the casing 13.

In tests made on the size of the smoke particles formed from titanium tetrachloride in this fashion it was found that they were within the limits of 1 to 10 microns.

In an actual test made in an oil well in Pennsylvania, it was found that after evaporation of 1500 cc. of liquid titanium tetrachloride, the average injection rate dropped from 28,000 C. F./day to 13,800 C. F./day. In a second well, in which 700 cc. of titanium tetrachloride were evaporated, in the manner described, the gas injection rate dropped from 19,600 C. F./day to 7,300 C. F./day. The corresponding recoveries of oil, in a producing well, located between the two plugged wells, after a temporary drop after plugging, changed from 2.8 bbl./wk. to 3.0 bbl./wk.

This corresponds to a change in gas-fluid ratio from 50,000 to 26,000 after a temporary rise, or an indicated improvement of nearly 100 percent on the volume of injected air.

It is desirable, although not absolutely necessary, to evaporate ammonium hydroxide in the same manner and pass it out into the adjacent formation, thereby neutralizing the hydrogen chloride formed in the tubing and still present in the near-by formation.

While the above description represents one form of the invention it is not the only way it may be carried out, and the scope of our invention is limited only by the following claims.

We claim:

1. In the recovery of oil from underground oil-bearing formations by gas injection drive, the improvement which comprises vaporizing in a stream of moisture-containing gas, the tetrachloride of an element of the group consisting of silicon, titanium, and tin, admixing said tetrachloride in the vapor state with said moisture containing gas, thereby causing said tetrachloride to react with the moisture in said gas with the resultant formation of a smoke comprising finely divided solid particles, forcing the resultant smoke into the surrounding formation, whereby the more permeable portions of said formation are at least partially plugged and the injection rate of gas into the said formation is substantially lowered, and recovering oil from said oil-bearing formation by said gas injection drive.

2. The method of claim 1 in which the tetrachloride is vaporized within the well.

3. The method of claim 1 in which a volatile base is injected subsequent to the smoke formation to neutralize the acid liberated during smoke formation.

4. The method of claim 1 in which the chloride employed is titanium tetrachloride.

5. The method of claim 1 in which the chloride employed is silicon tetrachloride.

6. The method of claim 1 in which the chloride employed is tin tetrachloride.

References Cited in the file of this patent

UNITED STATES PATENTS

| | | |
|---|---|---|
| 2,019,908 | Kennedy et al. | Nov. 5, 1935 |
| 2,081,541 | Joosten | May 25, 1937 |
| 2,272,673 | Kennedy | Feb. 10, 1942 |
| 2,469,354 | Bond | May 10, 1949 |
| 2,633,919 | Bauer | Apr. 7, 1953 |

OTHER REFERENCES

McPherson et al.: Chemistry, pub. by Ginn, 1940, pp. 421, 430, 431, 685, 686. Copy in Scientific Library.